Dec. 6, 1938.   F. W. PEEL   2,138,877
GAS EXPANDED RUBBER
Filed Oct. 15, 1935   2 Sheets-Sheet 1
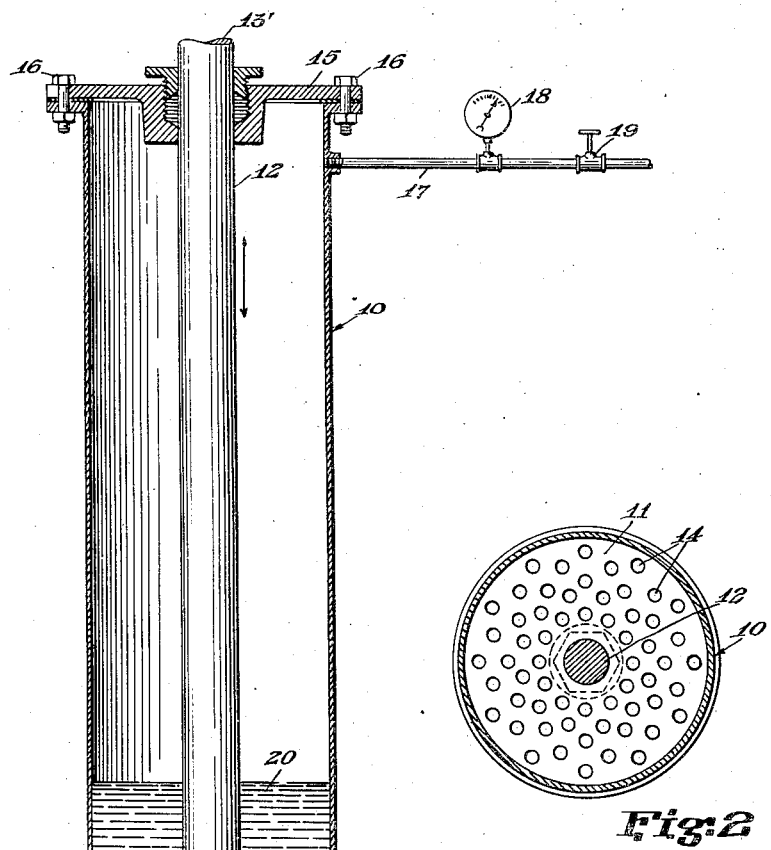
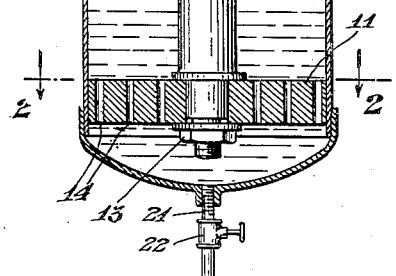
INVENTOR.
Frederick W. Peel
BY
Samuel Ostrolenh
ATTORNEY.

Dec. 6, 1938.    F. W. PEEL    2,138,877
GAS EXPANDED RUBBER
Filed Oct. 15, 1935    2 Sheets-Sheet 2
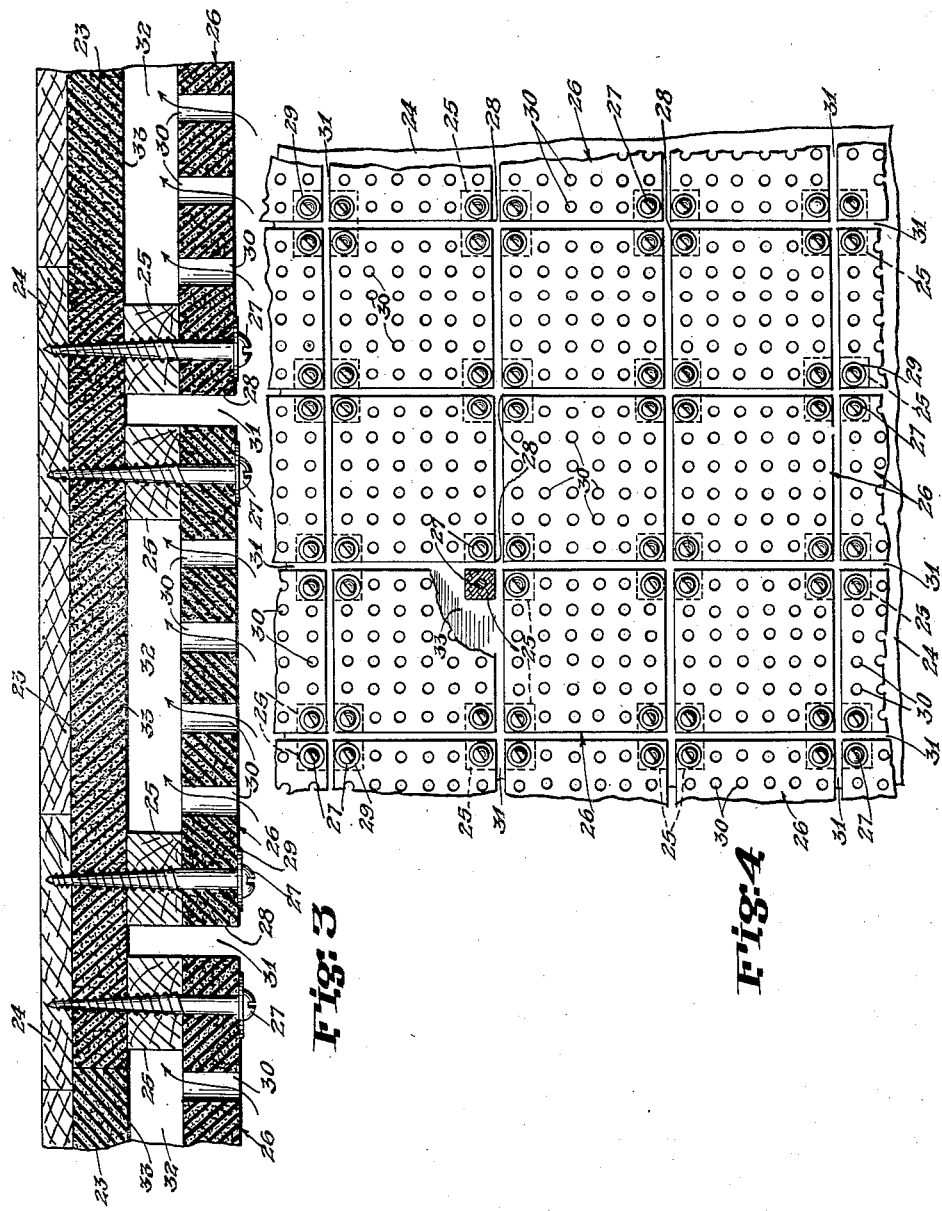
INVENTOR.
Frederick W. Peel
BY
ATTORNEY.

Patented Dec. 6, 1938

2,138,877

UNITED STATES PATENT OFFICE 2,138,877

GAS EXPANDED RUBBER

Frederick W. Peel, Bedford, Va., assignor to Rubatex Products, Inc., New York, N. Y., a corporation of Delaware Application October 15, 1935, Serial No. 45,051

3 Claims. (Cl. 18—53)

My invention relates to novel methods of and means for gassing rubber dough in the manufacture of expanded rubber.

The manufacture of expanded rubber consists in thoroughly impregnating a suitable rubber mixture with an inert gas at very high pressure and subsequently heat treating the gassed mixture for final expansion and vulcanization. Such a process is the basis of the Denton patents, such as U. S. Patent No. 1,905,269, dated April 25, 1933, and the co-pending U. S. application Serial No. 717,550, filed March 27, 1934, of which I am a co-inventor. The high gas pressure is applied in an autoclave and is of the order of 150–200 atmospheres. The gassing chamber is, therefore, necessarily an expensive apparatus. The rubber that is to be gassed under this high pressure has to be prepared and placed in a vehicle which makes it possible for it to be handled in and out of the gassing chamber. Therefore, the preparation and machinery required, plus the labor, makes such a process very expensive.

It is, accordingly, an object of my invention to break down the rubber to such a plastic form that it will be possible to impregnate this dough with the inert gas without the use of a high pressure chamber.

It is another object of my invention to provide novel means for mixing the dough with the inert gas.

It is still another object of my invention to provide a novel method of preventing the gassed rubber dough from losing any of the gas after the gassing stage.

It is a further object of my invention to provide a novel process in the formation of the rubber mixture before the final curing stage.

It is still a further object of my invention to provide a novel gas expanded rubber that is noninflammable.

It is another object of my invention to provide a novel application for the gas expanded rubber product of my invention to increase its acoustic absorption properties.

These and other objects of my invention will become apparent in connection with the description to follow and the drawings, in which:

Figure 1 is a sectional elevation of the mixing apparatus;

Figure 2 is a sectional view along 2—2, showing the construction of the perforated plunger;

Figure 3 is a sectional drawing showing the assembly for increasing the acoustic absorption of gas expanded rubber applied to a ceiling;

Figure 4 shows a portion of the ceiling construction.

Carrying out my invention, the following ingredients may be used to make the rubber mixture in the indicated proportions by weight:

| | |
|---|---|
| Rubber | 37 lbs. 8 oz. |
| Light calcium magnesium | 3 lbs. 0 oz. |
| Lithophone | 3 lbs. 0 oz. |
| Paraffin wax | 1 lb. 8 oz. |
| Zinc oxide | 1 lb. 8 oz. |
| Sulphur | 2 lbs. 4 oz. |
| Diphenylguanidine | 4 oz. |
| Agerite | 8 oz. |
| Carbon black | 1½ oz. |

Reasonable changes in these proportions, or in the specified components are entirely feasible. The ingredients are individually mixed on the mill in a manner well known in the art of rubber compounding. The individual sheets of rubber are masticated or softened into a single soft mass by masticating rollers which are heated to a temperature of 150° F. The dough or rubber mix is prepared in the manner described in the above-identified application, Serial No. 717,550.

To render the rubber mixture plastic so that it will be possible to impregnate the dough with the inert gas, add approximately 35 gallons of carbon tetrachloride and place the whole into the cylindrical drum 10 of Figure 1. I have found that the most suitable volume of this drum 10 to be about three times that of the total volume of this mixture.

The apparatus I illustrate in Figure 1 for carrying out the gas mixing stage of my invention consists essentially of a cylindrical drum 10 which contains the plunger 11 at the end 13 of the rod 12. This plunger 11 has a plurality of holes 14 drilled through it, as clearly illustrated in Figure 2.

After the mixture 20 of rubber dough and carbon tetrachloride is placed in the drum 10, the gas-tight lid 15 is clamped on the drum 10 with bolts 16. The nitrogen is admitted to the drum 10 through the pipe line 17 at relatively low pressure. The pressure gauge 18 and valve 19 are shown connected to the pipe line 17. Nitrogen at about 100 lbs. pressure is applied to the interior of the drum. The plunger 11 is then caused to reciprocate vertically through the mixture 20 by connecting suitable mechanical means, not shown, to the other end 13' of the rod 12. The perforated plunger 11 causes the rubber dough and the carbon tetrachloride solution to amalgamate homogeneously and the gas to be impregnated throughout the mass, resulting in a rubber froth. This process is continued for about two hours.

To maintain this froth intact, the resulting mass is poured into very hot molds in order to form a skin around it. This skin is formed in a few seconds and prevents the escape of any confined nitrogen. I provide an outlet line 21 with a valve 22 to conduct the rubber froth from the drum 10 to the molds. Subsequent to the skin formation at the relatively high temperature, the temperature of the molds is then reduced and permitted to remain this way until the rubber is finally cured.

The following is an alternative method for producing gas expanded rubber with the use of my apparatus. The rubber dough is prepared in a manner similar to that described hereinabove except that the sulphur and the diphenylguanidine accelerator are omitted and a little additional softener, such as stearic acid or reogen, is added. The dough is prepared to a consistency of thick grease. This dough in a warm state is placed into the drum 10 and the lid 15 is clamped thereon. Nitrogen at about 25 pounds per square inch pressure is then admitted. The plunger 11 is reciprocated to cause the dough to adsorb the nitrogen gas, and this is continued until the dough and the gas are homogeneously beaten together. The necessary sulphur and accelerator (diphenylguanidine) are then forced into the froth with the aid of the reciprocating plunger 11. The dough is then forced into the heated molds and is finally cured.

The introduction of carbon tetrachloride to the mixture renders the gas expanded rubber product non-inflammable. The property of an expanded rubber that it will not burn is an advantage for such a product, which, although not a primary object of my invention, is a result thereof due to the use of carbon tetrachloride as the amalgamating agent in the gas impregnating stage.

The rubber froth produced as hereinabove set forth, may be vulcanized and expanded to final form in a manner similar to the die-casting of particular metal alloys well known in the mechanical arts. The froth is forced through bleeders which communicate into a plurality of molds. These molds may have complicated forms. The necessary heat is applied to the molds by means of steam coils arranged about them or by enclosing steam chambers about the molds. The steam heat causes the gassed rubber to expand and fill every crevice of the mold, and finally cures or vulcanizes the rubber. The myriad of gas cells are small and independent of each other. The molds must be cooled before removed, to prevent the gas cells in the heated rubber from bursting. The steam is accordingly shut off and cold water is accordingly circulated in place of the steam. The completed molds are then removed. This is a cheap, quick and efficient process for producing gas expanded rubber products of simple or complicated shapes.

The gas expanded rubber product of my invention may be made up into solid boards and these boards have marked acoustic absorbing properties comparable to other well-known acoustic board materials. Although these boards may be utilized in any well-known manner for their acoustic characteristics, I have indicated in Figures 3 and 4 their application in a novel manner to further increase their acoustic absorption properties by as much as 40%.

In Figure 3 I have shown such gas expanded boards 23 suitably attached to wooden ceiling planking 24. Spaced from the rubber boards 23 by Celotex or balsa wood spacers 25 are gas expanded rubber blocks 26, mounted as indicated in Figures 3 and 4. Wood screws 27 hold the rubber blocks 26 in position. These screws 27 pass through the respective corners 28 of the rubber blocks 26, through the balsa wood spacers 25, through the rubber boards 23, and onto the ceiling planking 24. Fiber washers 29 may be placed under the head of the screws 27. The rubber blocks 26 may well be 1 foot square and of reasonable thickness. These blocks 26 have a plurality of holes 30 formed through them. The blocks 26 are spaced from each other, as indicated in Figure 4, and form a regular ceiling pattern.

The sound waves impinging on this ceiling construction will first impinge upon the surface of the acoustic rubber blocks 26 where a great percentage of the sound is absorbed. The sound pressure waves also pass through the holes 30 and spaces 31 and another percentage of the sound is absorbed along the surfaces encountered therethrough. The remaining sound pressure waves enter the relatively confined air spaces 32 and impinge upon the surfaces 33 of the rubber boards 23. The remainder of the sound energy is absorbed in this region. This method of construction is not intended solely for ceilings but may be applied in general for improved acoustic absorption. Similarly, this method of construction may equally well be utilized with acoustic absorbing materials other than the rubber blocks 26 and rubber boards 23.

Although I have described in detail a preferred embodiment of apparatus which I use in gas impregnating the rubber according to my invention and although I describe specific constituents of the mixture and preferred steps for its production, it will be obvious that modifications still coming within the scope of my invention may be made as to the constituents, the steps in the process, and in the apparatus therefor, and I do not intend to be limited except by the appended claims.

I claim:

1. The method of manufacturing gas expanded cellular rubber which comprises vigorously agitating a rubber solution in the presence of nitrogen at a pressure of the order of 25 to 100 pounds per square inch to form a cellular rubber froth, pouring the cellular rubber froth into a mold heated to a temperature above that necessary to vulcanize the rubber to form a skin on the rubber froth so as to prevent escape of gas contained therein and reducing the initial temperature of the mold to completely and uniformly vulcanize the gas expanded cellular rubber.

2. The method of manufacturing gas expanded cellular rubber which comprises vigorously agitating a rubber solution in the presence of an inert gas at a pressure of the order of 25 to 100 pounds per square inch to form a cellular rubber froth, pouring the cellular rubber froth into a mold heated to a temperature above that necessary to vulcanize the rubber to form a skin on the rubber froth so as to prevent escape of gas contained therein and reducing the initial temperature of the mold to completely and uniformly vulcanize the gas expanded cellular rubber.

3. The method of manufacturing gas expanded cellular rubber which comprises forming a rubber solution; agitating the rubber solution vigorously in the presence of an inert gas under low pressure to form a cellular rubber structure; passing the gassed cellular rubber to a mold heated to a temperature above that necessary to vulcanize the rubber so as to form a skin on the cellular rubber structure in the mold so as to prevent the escape of the gas contained therein and reducing the initial amount of heat applied to the cellular rubber to completely and uniformly vulcanize the gas expanded cellular rubber.

FREDERICK W. PEEL.